United States Patent
Pierrottet et al.

(10) Patent No.: US 12,449,538 B2
(45) Date of Patent: Oct. 21, 2025

(54) AMBIGUITY MITIGATION FOR FMCW LIDAR SYSTEM

(71) Applicant: UNITED STATES OF AMERICA AS REPRESENTED BY THE ADMINISTRATOR OF NASA, Washington, DC (US)

(72) Inventors: Diego F. Pierrottet, Poquoson, VA (US); Glenn D. Hines, Yorktown, VA (US); Farzin Amzajerdian, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 1185 days.

(21) Appl. No.: 17/329,976

(22) Filed: May 25, 2021

(65) Prior Publication Data

US 2021/0373157 A1 Dec. 2, 2021

Related U.S. Application Data

(60) Provisional application No. 63/030,215, filed on May 26, 2020.

(51) Int. Cl.
  *G01S 17/34* (2020.01)
  *G01S 7/481* (2006.01)
  (Continued)

(52) U.S. Cl.
  CPC ............ *G01S 17/34* (2020.01); *G01S 7/4817* (2013.01); *G01S 17/58* (2013.01); *G01S 17/89* (2013.01)

(58) Field of Classification Search
  CPC ........ G01S 17/34; G01S 7/4814; G01S 17/58; G01S 17/89; G01S 17/36; G01S 17/32; G01S 7/4817
  See application file for complete search history.

(56) References Cited

U.S. PATENT DOCUMENTS 5,289,252 A    2/1994   Nourrcier
6,147,747 A    11/2000  Kavaya et al.
(Continued)

OTHER PUBLICATIONS

F. Amzajerdian, G. D. Hines, D. F. Pierrottet, B. W. Barnes, L. B. Petway and J. M. Carson, "Navigation Doppler Lidar for autonomous ground, aerial, and space vehicles," 2018 Conference on Lasers and Electro-Optics (CLEO), San Jose, CA, USA, 2018, pp. 1-2 (Year: 2018).*

(Continued)

*Primary Examiner* — Yuqing Xiao
*Assistant Examiner* — Isabelle Lin Boegholm
(74) *Attorney, Agent, or Firm* — Robin W. Edwards; Trenton J. Roche (57) ABSTRACT

An FMCW Doppler lidar system and method for use in a host vehicle includes a laser system, lenses, a homodyne receiver, and a signal processing unit (SPU). The laser beam is modulated to generate a frequency waveform with three segments, i.e., Doppler, up-ramp, and down-ramp. The lenses transmit laser beams toward a target-of-interest, and receive return beams reflected from the target-of-interest. The homodyne receiver has photoreceptors configured to mix the return beams with a respective local oscillator beam to generate a three-section return waveform. The SPU is coupled to the photoreceptors and calculates a respective magnitude and frequency of an up-ramp, down-ramp, and/or Doppler IF section of the return waveform, estimates a sign of the IF sections, and calculates a range and/or velocity (Continued)

relative to the target-of-interest using the estimated sign, and controls the host vehicle using the range and/or velocity.

20 Claims, 7 Drawing Sheets

(51) Int. Cl.
*G01S 17/58* (2006.01)
*G01S 17/89* (2020.01)

(56) References Cited

U.S. PATENT DOCUMENTS

| | | | |
|---|---|---|---|
| 8,897,654 B1 | 11/2014 | Pierrottet et al. | |
| 9,007,569 B2 | 4/2015 | Amzajerdian et al. | |
| 9,712,250 B2 | 7/2017 | Pierrottet et al. | |
| 2014/0036252 A1* | 2/2014 | Amzajerdian | G01S 17/875 |
| | | | 356/28 |
| 2014/0184437 A1* | 7/2014 | Takabayashi | G01S 7/352 |
| | | | 342/107 |
| 2015/0323649 A1* | 11/2015 | Lee | G01S 13/584 |
| | | | 342/27 |
| 2016/0170023 A1* | 6/2016 | Rondeau | G01S 7/4917 |
| | | | 398/25 |
| 2017/0269198 A1* | 9/2017 | Hall | G01S 7/4816 |

OTHER PUBLICATIONS

Amzajerdian et al., "Doppler Lidar Sensor for Precision Landing on the Moon and Mars", IEEE Aerospace Conference Proceedings, Mar. 2, 2012, pp. 1-7.

\* cited by examiner

Fig-11

AMBIGUITY MITIGATION FOR FMCW LIDAR SYSTEM

CROSS-REFERENCE TO RELATED PATENT APPLICATION(S)

This patent application claims the benefit of and priority to U.S. Provisional Patent Application No. 63/030,215, titled "Ambiguity Mitigation for FMCW Sawtooth Waveform," filed on May 26, 2020, the contents of which are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

Terrestrial and space navigation, rendezvous, and docking efforts require precise navigational data in order to derive accurate knowledge of vehicle relative velocity, range, and altitude. For instance, spacecraft rely on real-time navigational data to control descent and ensure a soft landing at a designated landing site. Radio and/or light wave-based navigation systems may also be used to such ends, with range-to-ground surface measurements performed along multiple lines-of-sight (LOS). The multiple LOS measurements are used by an onboard navigation system to determine vehicle attitude, altitude, vector velocity, and other control parameters. Furthermore, the derived velocity may be used to drive angles of attack and side-slip control actions for real-time guidance and control.

Light Detection and Ranging, better known as lidar, is a particular type of remote sensing technology that functions by illuminating a target-of-interest, typically using continuous wave (CW) or quasi-CW light having an instantaneous frequency that varies linearly with time. A round-trip time-of-flight of each reflected light pulse is determined using a sensor to estimate a range to the target. Lidar systems obtain high-resolution range and relative velocity information from such light beams. In a homodyne receiver configuration common to lidar systems, a portion of the transmitted laser beam serves as a local oscillator for an optical receiver. Mixing of the local oscillator field with a time-delayed received field yields an intermediate frequency (IF) signal that is directly related to the target range, with the IF being fixed for each returned pulse.

A particular embodiment of the lidar system described herein transmits modulated three-section waveforms in different fixed directions to determine relative velocity and range to ground along three laser LOS. The transmitted waveforms are "three-section" in the sense of having separate Doppler, up-chirp/up-ramp, and down-chirp/down-ramp sections. The three LOS measurements are combined to determine three components of a velocity vector, and to accurately measure altitude and attitude of a spacecraft, aircraft, or another host vehicle relative to a ground surface.

A frequency-modulated continuous wave (FMCW) waveform is one in which the laser frequency is modulated linearly with time rather than its amplitude. That is, rather than pulses of light, a frequency-variant continuous wave is detected by the homodyne receiver setup. Linear FMCW waveforms provide the above-noted distance to a target, as well as relative velocity between the sensor and the target. Underlying measurements are obtained in the frequency domain by the homodyne receiver. However, phase information is lost during homodyne detection, and thus conventional approaches to implementing FMCW techniques in a lidar system can produce inaccurate measurements.

SUMMARY

An improved frequency-modulated continuous wave (FMCW) Doppler Lidar system is disclosed herein, along with associated methods for using such a system. The Doppler lidar system uses a homodyne receiver to detect a three-section return waveform, i.e., one having a Doppler intermediate frequency (IF) section and separate up-ramp and down-ramp IF sections. Phase information is lost during detection of the three IFs described herein, as noted generally above. Sign ambiguities therefore occur as a result of the lost frequency information. Incorrect sign assignments in turn can lead to inaccurate conversion of the IFs to corresponding engineering units, and thus to navigational errors. However, the nature of the three-section return waveform available at the homodyne receiver provides a way to recover phase information, with the present teachings situationally exploiting qualities of the three-section waveform in a sign estimation and assignment process to improve navigational accuracy as set forth herein.

As will be appreciated by those of ordinary skill in the art, a three-section return waveform within the context of the FMCW lidar includes the above-noted linear up-ramp or "up-chirp" IF section, the linear down-ramp or "down-chirp" IF section, and the constant frequency/Doppler IF section. The present approach uses timing knowledge of the three-section return waveform on each channel of the homodyne receiver to mitigate sign ambiguities, i.e., the particular condition that exists whenever one or more of the three IF sections is not detected due to signal loss, drop out, interference, or other reasons. The method may be encoded as a computer-executable algorithm and used by a control circuit of the Doppler lidar system to estimate and assign a positive or negative sign to each IF section detected by the homodyne receiver, with range and/or velocity determined using the estimated sign. Operation of a host spacecraft, aircraft, or other vehicle may be controlled using the estimated sign and determining correct LOS range and velocity for each beam.

In a particular embodiment, the FMCW Doppler lidar system for use with a host vehicle includes a laser system, a frequency modulator, lenses, a homodyne receiver, and a control circuit/signal processing unit (SPU). The laser system is configured to generate first, second, and third laser beams and first, second, and third local oscillator beams using a seed laser and a beam splitter. The frequency modulator generates a modulated three-section waveform having a Doppler section, an up-ramp section, and a down-ramp section as described above. The lenses transmit the three-section waveform toward a target-of-interest, and receive respective first, second, and third return beams each reflected from the target-of-interest.

The homodyne receiver in this embodiment receives and mixes each of the return beams with a respective one of the local oscillator beams to detect a return waveform having a Doppler IF section, an up-ramp IF section, and a down-ramp IF section. The SPU is coupled to the homodyne receiver and configured to calculate or otherwise determine a respective magnitude and frequency of, and estimate a sign of, each of the up-ramp IF section, the down-ramp IF section, and/or the Doppler IF section, to calculate a range to the target-of-interest and/or velocity of the host vehicle relative to the target-of-interest using the respective magnitude, frequency, and estimated sign, and to thereafter directly or indirectly control an operation of the host vehicle using the range and/or the velocity.

A method is also used for using a FMCW Doppler lidar system aboard a host vehicle. The method includes generating, via a laser system having a seed laser and a beam splitter, first, second, and third laser beams and first, second, and third local oscillator beams. The method also includes generating a modulated three-section waveform via a frequency modulator, the three-section waveform having a Doppler section, an up-ramp section, and a down-ramp section. The method additionally includes transmitting, using first, second, and third lenses, the three-section waveform toward a target-of-interest external to the host vehicle, and receiving, using the lenses, respective first, second, and third return beams reflected from the target-of-interest.

The method in this example embodiment also includes receiving and mixing, via first, second, and third photoreceptors of a homodyne receiver, each of the return beams and a respective one of the local oscillator beams to detect a return waveform having a Doppler IF section, an up-ramp IF section, and a down-ramp IF section. The SPU determines a respective magnitude, frequency, and sign of the up-ramp IF section, the down-ramp IF section, and/or the Doppler IF section, with the sign being estimated as set forth herein, and calculates a range to the target-of-interest and/or velocity of the host vehicle relative to the target-of-interest using the respective magnitude, frequency, and sign. Thereafter, the method includes controlling an operation of the host vehicle using the range and/or the velocity.

These and other features, advantages, and objects of the present disclosure will be further understood and appreciated by those skilled in the art by reference to the following specification, claims, and appended drawings. The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

DETAILED DESCRIPTION

Figure 1:
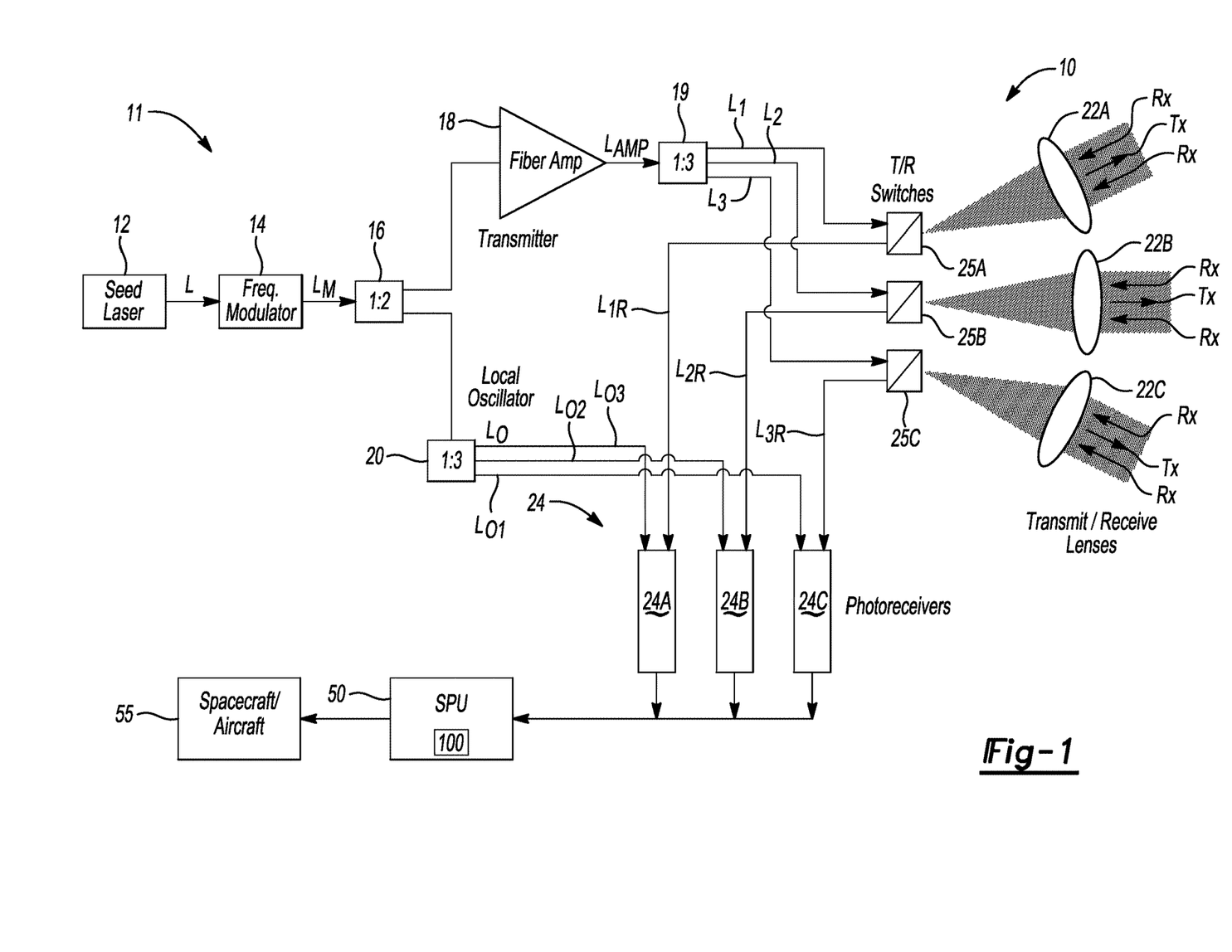
FIG. 1 is a schematic illustration of a frequency-modulated continuous wave (FMCW) Doppler lidar system optionally embodied as a representative Navigation Doppler Lidar (NDL) system as disclosed herein.

For purposes of description herein, the terms "upper," "lower," "right," "left," "rear," "front," "vertical," "horizontal," and derivatives thereof shall relate to orientation shown in FIG. 1. However, it is to be understood that various alternative orientations and step sequences may be envisioned, except where expressly specified to the contrary. Also for purposes of the present detailed description, words of approximation such as "about," "almost," "substantially," "approximately," and the like, may be used herein in the sense of "at, near, or nearly at," or "within 3-5% of," or "within acceptable manufacturing tolerances," or any logical combination thereof. It is also to be understood that the specific devices and processes illustrated in the attached drawings, and described in the following specification, are exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 schematically depicts a frequency-modulated continuous wave (FMCW) Doppler lidar system 10 having a signal processing unit (SPU) 50, e.g., a command and data handling unit, coupled to or in communication with a host vehicle 55 such as a spacecraft or aircraft during a representative flight or landing operation, or a ground vehicle, robot, or other mobile system in different possible embodiments. As set forth below with reference to FIGS. 2-11, the SPU 50 executes instructions embodying a method 100 to situationally enable automated sign estimation of intermediate frequencies (IFs) of a three-section waveform as detected on each of three receiver channels by the Doppler lidar system 10, i.e., an up-ramp IF section ($F_{UP}$), a down-ramp IF section ($F_{DN}$), and a Doppler IF section ($F_{DOP}$) as noted above.

The SPU 50 executes the method 100 to estimate the sign of one or more of the IF sections in a case-specific manner, with the case being dependent upon which of the IF sections are received and thus available to the SPU 50 at a given measurement instance. Such sign estimates, along with the respective calculated frequency and magnitude, are then used by the SPU 50 to derive range and/or velocity of the host vehicle 55 relative to a ground surface or target-ofinterest, doing so without the use of external state estimators. As will be appreciated, the Doppler lidar system 10 depicted in FIG. 1 operates continuously in real-time to produce independent range and relative velocity measurements by each line-of-sight (LOS) used to take a given set of lidar measurements.

The exemplary Doppler lidar system 10 of FIG. 1 includes a laser system 11 inclusive of a laser generator 12, e.g., an application-suitable seed laser. The laser generator 12 produces or generates a relatively low-power laser beam (arrow L) having a narrow linewidth, i.e., a single-frequency laser beam. For instance, the laser generator 12 may produce the laser beam (arrow L) with a power level in a range of about 0.01 to 0.05 Watts (W). The laser generator 12 may be variously embodied as a fiber laser with a volume grating, a semiconductor laser having an external cavity Bragg grating, or another suitable laser configuration.

As part of such a laser system 11, a frequency modulator 14 is coupled to the laser generator 12. The frequency modulator 14 is configured to receive the laser beam (arrow L) and modulate its frequency to thereby define a modulated waveform/laser beam (arrow $L_M$) having a predetermined three-section "sawtooth" modulated waveform, as described in greater detail below. The frequency modulator 14 may be an electro-optical frequency modulator 14 driven by an electric ramp generator (not shown) using a pre-defined modulation waveform. As will be appreciated, such an electric ramp generator may include a voltage-controlled oscillator controlled by a digital microcontroller to generate pre-defined ramp characteristics, which in turn are provided to the voltage-controlled oscillator to create the pre-defined modulation waveform. An exemplary setup for such an electric ramp generator, with an optical filter used to eliminate all frequency harmonics generated by the modulator 14, is disclosed in U.S. patent application Ser. No. 13/527,638, issued as U.S. Pat. No. 8,897,654 B1, which is hereby incorporated by reference in its entirety.

Within the representative laser system 11 configuration of FIG. 1, a beam splitter 16 disposed downstream of the frequency modulator 14 receives the modulated laser beam (arrow $L_M$) from the frequency modulator 14 and splits the modulated laser beam into two separate portions, as indicated by the notation "1:2" in FIG. 1. The beam splitter 16 is disposed between and interconnects an amplifier 18 ("Fiber Amp") and another beam splitter 20 ("1:3") with the frequency modulator 14. The beam splitter 16 directs a first portion of the modulated laser beam (arrow $L_M$) toward the amplifier 18 in a "Transmitter" path, and directs a second portion of the modulated laser beam (arrow $L_M$) toward the beam splitter 20 as described below for use as a "Local Oscillator" path.

The amplifier 18 is configured to amplify power of the first portion of the modulated laser beam (arrow $L_M$) so as to define an amplified laser beam (arrow $L_{AMP}$). For example, the amplifier 18 may increase power of the laser beam (arrow $L_M$) to a range between 1 W and 10 W (peak power). The amplifier 18 may include, for example, a single-mode fiber amplifier, and may be operated at less than a 100% duty factor, i.e., in a pulsed mode, so as to reduce power consumption. In an embodiment, the amplifier 18 may operate at a duty factor of less than about 10%, and may be enabled for a few milliseconds at a rate of about 30 Hz. Such an embodiment is non-limiting and intended herein to convey exemplary ranges and magnitudes, and therefore other embodiments of the amplifier 18 may be envisioned within the scope of the disclosure.

The Doppler lidar system 10 of FIG. 1 further includes transmit/receive lenses 22A, 22B, and 22C, each of which is in communication with the above-described amplifier 18. Each of the lenses 22A, 22B, and 22C, i.e., respective first, second, and third lenses, receives a part of the first portion of the amplified laser beam (arrow $L_{AMP}$) from the amplifier 18, and expands and transmits the respective part of the first portion of the laser beam toward a target-of-interest (not shown), as indicated by arrows Tx. Thereafter, the lenses 22A, 22B, and 22C receive reflected radiation (arrows Rx) from the target-of-interest and focus the reflected radiation, e.g., into a fiber optic cable, as a return waveform having the intermediate frequency content described below. Because the Doppler lidar system 10 includes the three lenses 22A, 22B, and 22C, each of which is directed in a different direction, all of the transmit/receive lenses 22A, 22B, and 22C may remain stationary relative to each other, i.e., the lenses 22A, 22B, and 22C do not move or scan during operation.

The Doppler lidar system 10 of FIG. 1 further includes transmit/receive (T/R) switches 25A, 25B, and 25C, with the number of T/R switches 25A, 25B, and 25C being equal to the number of lenses 22A, 22B, 22C. Each T/R switch 25A, 25B, and 25C is disposed between and interconnects the amplifier 18 and one of the lenses 22A, 22B, 22C. Each of the T/R switches 25A, 25B, 25C directs a respective part of the amplified laser beam (arrow $L_{AMP}$) from the amplifier 18 to a respective lens 22A, 22B, or 22C, and directs the received reflected radiation from the respective lens 22A, 22B, or 22C to a homodyne receiver 24 having respective photoreceivers 24A, 24B, and 24C.

An additional beam splitter 19 is disposed between and interconnects the amplifier 18 and the T/R switches 25A, 25B, and 25C. The beam splitter 19 splits the amplified laser beam (arrow $L_{AMP}$) into equal parts, here three equal parts as indicated by the notation "1:3", and directs a respective one of the parts L1, L2, and L3 toward each of the T/R switches 25A, 25B, and 25C. The beam splitter 20 noted above receives the second portion of the modulated laser beam (arrow $L_M$) from the primary laser beam splitter 16, and adjusts the polarization of the second portion of the modulated laser beam to define a local oscillator beam (arrow $L_O$) that matches the polarization of each of the return signals L1R, L2R, and L3R.

At the beam splitter 20, the local oscillator beam (arrow $L_O$) likewise splits into three equal parts LO1, LO2, and LO3 that are directed toward a respective one of the photoreceivers 24A, 24B, and 24C. Each of the photoreceivers 24A, 24B, 24C thus receives a respective part LO1, LO2, or LO3 of the local oscillator beam and respective reflected radiation/return signals L1R, L2R, and L3R from a respective T/R switch 25A, 25B, 25C, and then mixes the two together in an optical homodyne detection scheme, as will be appreciated by those of ordinary skill in the art. Thus, the photoreceivers 24A, 24B, 24C collectively form the homodyne receiver 24 within the context of the Doppler lidar system 10. The photoreceivers 24A, 24B, and 24C mix the local oscillator beam with the reflected radiation to produce an intermediate electrical signal with a frequency equal to the difference between frequencies of the reflected signals and the respective parts LO1, LO2, and LO3 of the local oscillator beam (arrow $L_O$).

Within the scope of the disclosure, the SPU 50 noted briefly above is coupled to and in communication with the homodyne receiver 24. The SPU 50 analyzes and stores data received from the individual photoreceivers 24A, 24B, and 24C and uses the data to calculate and/or determine various navigational data as described below with reference to FIG. 2. A processor 54 (FIG. 2) residing in the SPU 50 computes the frequency and magnitude of the intermediate frequency signal provided by the photoreceivers 24A, 24B, and 24C. From the frequencies associated with the three segments of the FMCW modulation waveform, the processor 54 calculates LOS velocity and range of the host vehicle 55, e.g., a manned or unmanned host spacecraft or aircraft in this exemplary instance.

Figure 2:
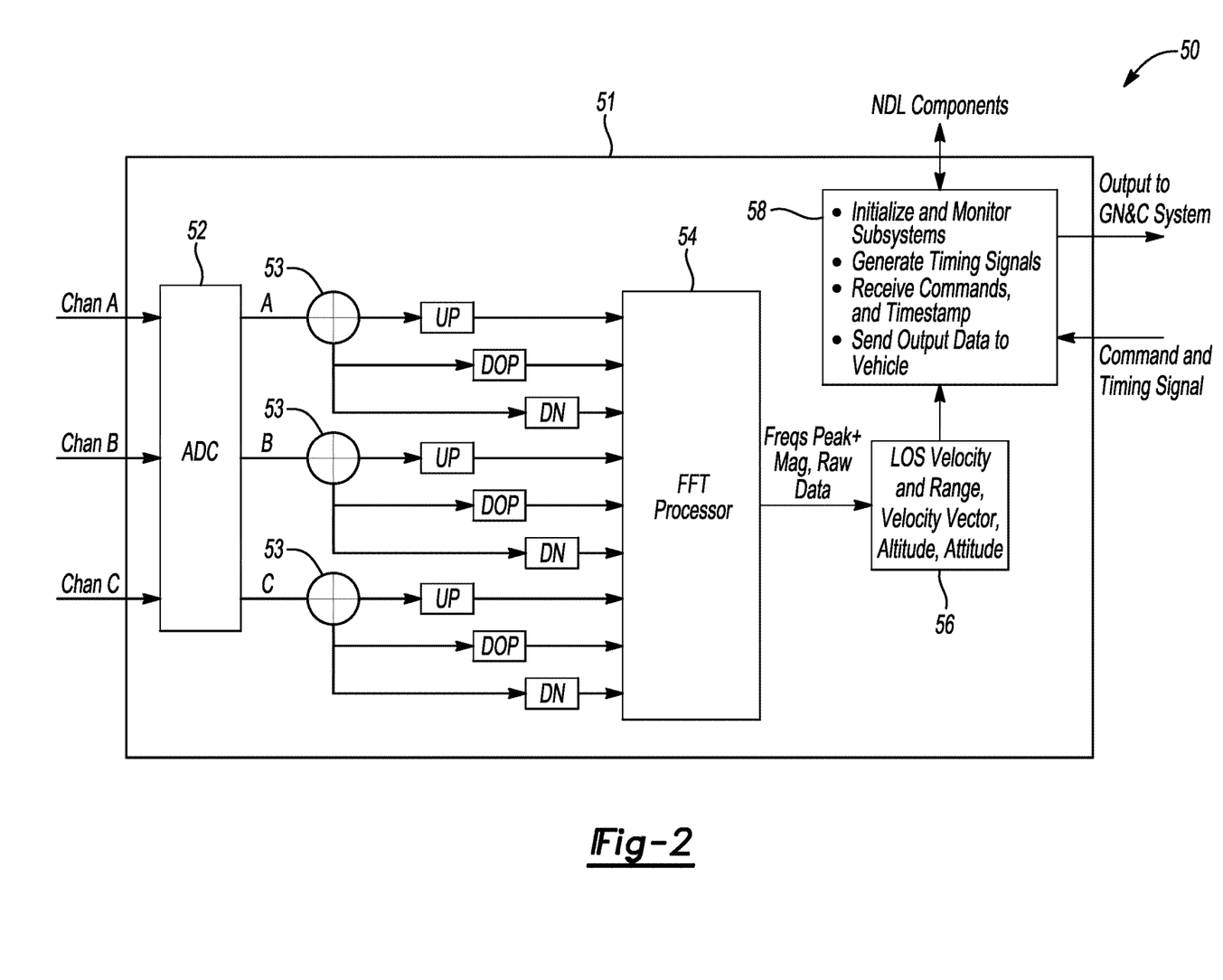
FIG. 2 is a schematic illustration of a circuit board for use with the example Doppler lidar system of FIG. 1.

Referring briefly to FIG. 2, a functional block diagram of the SPU 50 in an exemplary embodiment includes a field programmable gate array (FPGA) board 51 populated with an analog-to-digital converter (ADC) 52 and a fast-Fourier transformation (FFT) embodiment of the above-noted processor 54. The ADC 52 receives the returned waveform on three different channels (Chan A, Chan B, and Chan C). Digitized outputs A, B, and C of the ADC 52 are then passed through respective demultiplexers 53 to separate the up-ramp (UP), down-ramp (DN), and Doppler (DOP) intermediate frequency (IF) sections of the return signal. The FFT processor 54 thereafter applies high-resolution fast-Fourier transformation to the up-ramp, down-ramp, and Doppler IF sections of the return waveform to output the respective frequency, peak positive magnitude, and other raw data, as will be appreciated by those of ordinary skill in the art of FMCW Doppler lidar operations.

From such data, the SPU 50 derives the LOS velocity and range to the target-of-interest, a velocity vector, altitude, and attitude at a computation node 56, which may be implemented in hardware as another processor, ASIC, chip, or within the FPGA architecture. From such data, the SPU 50 may feed a control node 58 in communication with the host vehicle 55 of FIG. 1, e.g., by communication with components of the Doppler lidar system 10, and with a Guidance, Navigation, and Control (GN&C) system. The latter uses NDL to control the host vehicle 55, with the control node 58 being responsive to real-time command and timing signals that collectively control operation of the host vehicle 55, e.g., by changing the present dynamical state thereof. Representative NDL-related control actions are depicted in control node 58, including initializing and monitoring of any resident subsystems, generation of timing signals, receipt of command and timestamps thereof, and outputting of data to a resident GN&C system for operational control of the host vehicle 55. In other words, the control node 58 controls the various NDL components, e.g., by turning such components on with a defined sequence, monitoring their operational parameters, and turning them off again. Control node 58 also receives commands and timing signal from the host vehicle 55 and provides measured data and other relevant data back to the host vehicle 55.

The representative setup of FIG. 1 uses homodyne detection to obtain changes in signal frequency caused by reflection by the target-of-interest. As will be appreciated, homodyne detection refers to the case in which transmitted radiation is derived from the same source as the reference local oscillator, meaning that the frequencies are identical at the source. Differences between a received signal frequency and a local oscillator frequency are caused by target/sensor relative motion, i.e., addition or subtraction to the source frequency is caused by the Doppler effect. For the case of linear FMCW, in addition to the Doppler effect the difference in frequency between a received signal and the local oscillator signal are in proportion to the slope of the linear modulation of frequency and distance to the target.

Figure 3:
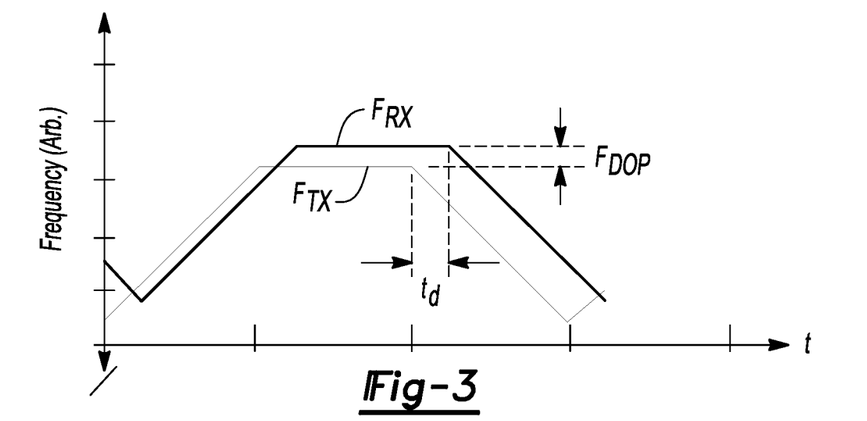
FIG. 3 is a schematic plot of representative three-section waveform with separate transmit, receive, and Doppler sections for use with the Doppler lidar system shown in FIG. 1.
Figure 4:
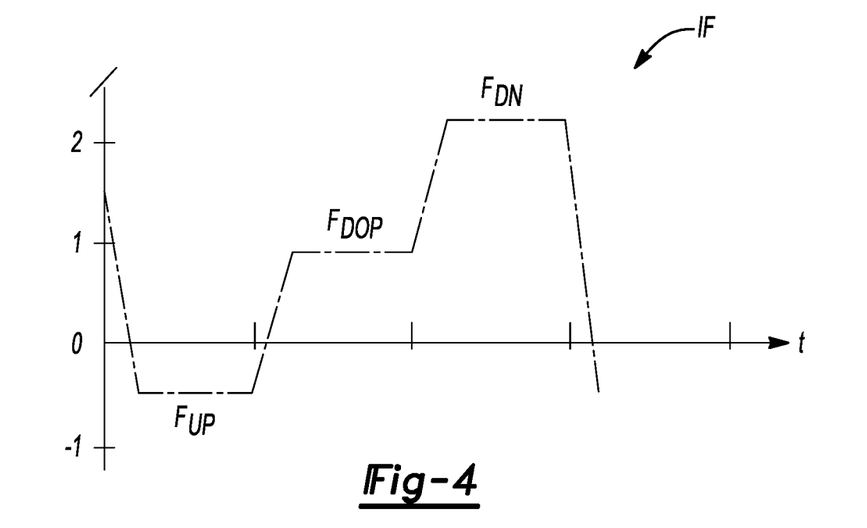
FIG. 4 is a schematic plot representative of three intermediate (difference) frequencies corresponding to the three-section waveform of FIG. 3 for use in the Doppler lidar system shown in FIG. 1.
Figure 5:
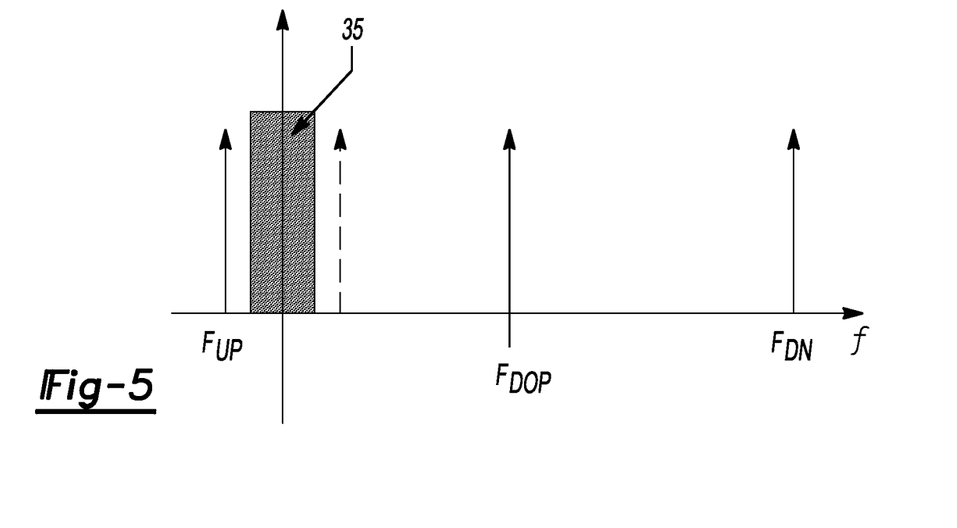
FIG. 5 is a nominal frequency plot of a nominal Doppler frequency flanked by side-band frequencies, and showing a representative dead band as set forth herein.

Referring to FIGS. 3-5, by design, the Doppler lidar system 10 of FIG. 1 when equipped with the SPU 50 of FIG. 2 measures three different IF sections, from which range and velocity measurements are ultimately derived. As shown in FIG. 3, a transmit frequency $F_{TX}$ is transmitted by the Doppler lidar system 10 toward the target-of-interest, e.g., a ground surface of a designated landing terrestrial, lunar, Martian, or asteroid surface. A receive frequency $F_{RX}$ is received as a return signal from the target-of-interest. Since the return signal arrives at some point in the future after transmission of the laser beams, a time delay (td) is present between the transmit frequency $F_{TX}$ and the receive frequency $F_{RX}$. Likewise, a Doppler shift (DOP) is present between the transmit frequency $F_{TX}$ and the receive frequency $F_{RX}$, with such a Doppler shift having a direction or sign that may be continuously estimated and updated by the SPU 50 during ongoing operation of the host vehicle 55.

As shown in FIG. 4, the photoreceivers 24 of FIG. 1 produce the above-noted intermediate frequencies (IF) in three different sections, i.e., the up-ramp IF ($F_{UP}$), the down-ramp IF ($F_{DN}$), and no frequency modulation/Doppler IF ($F_{DOP}$) sections. All three IF sections of the three-section waveform (per receiver channel A, B, and C of FIG. 2) are separated sequentially in time during transmission and acquisition. When plotted together, the IF section due to the up-ramp modulation component and the IF section due to the down-ramp modulation component are symmetrically positioned on either side of the IF due to the Doppler component, as shown in FIG. 5.

In FIG. 5, a dead band 35 is exaggerated for clarity, but is normally on the order of tens of kHz, e.g., about 0.05 MHz, when the full bandwidth of the Doppler lidar system 10 is greater than tens or hundreds of MHz, e.g., between 100 MHz and 500 MHz in a typical application. A feature of the present approach is that when one of the three IFs falls within the dead band 35, e.g., $F_{UP}$ as shown, the other two IFs $F_{DOP}$ and $F_{DN}$, can be used to extract the correct range and velocity. One can view the modulation IF sections as opposing side-bands riding symmetrically about or flanking the Doppler IF section ($F_{DOP}$) and having a frequency separation that is proportional to the distance between the Doppler lidar system 10 and the target/ground surface.

Thus, a range-to-target is computed as the product of a constant (k1) and half of the frequency difference between the up and down ramp IFs, i.e., $$k1\frac{(IF^+ - IF^-)}{2},$$

with k1 being a constant equal to the ratio $$\frac{TC}{2B},$$

$IF^+$ and $IF^-$ representing the up-ramp ($F_{UP}$) and down-ramp ($F_{DN}$) IFs, respectively, T being the waveform period, c being the speed of light, and B representing the signal bandwidth. Velocity is computed as the product of a second constant (k2) and half of the sum of the two side-band IFs, i.e., $$k2\frac{(IF^+ + IF^-)}{2},$$

where $$k2 = \frac{\lambda}{2},$$

with λ being the wavelength. Thus, one can readily see that errors in range and velocity calculations can result if the sign of any one or more of the IFs is incorrect. The method 100 of FIGS. 6-11 is therefore intended to address this potential problem, with the method 100 programmable as an algorithm in the SPU 50 of FIG. 2 and executed as part of the ongoing operation of the Doppler lidar system 10 shown in FIG. 1.

In terms of sign, the frequencies detected by Doppler lidar system 10 have a sign that is either positive or negative depending on the relative direction of motion between the Doppler lidar system 10 and the target/ground, and the relative distance to the target/ground. If used as part of a navigation system aboard a spacecraft during a descent and landing operation, for example, where a positive sign indicates movement of the spacecraft toward the ground and a negative sign indicates movement away from ground, accurate knowledge of the sign is critical. However, homodyne detection capabilities of the Doppler lidar system 10 via the homodyne receiver 24 shown in FIG. 1 offers direct measurement of signal frequency changes using absolute values of the frequencies, and therefore additional information is necessary in order to determine if the intermediate frequencies have a positive or negative sign. Knowledge of the position of the up-ramp IF section ($F_{UP}$) and the down-ramp IF section ($F_{DN}$) relative to the Doppler IF section ($F_{DOP}$) can be used to predict the direction/sign of the Doppler shift and the sign of the side bands as set forth herein, and thus to make correct range and velocity measurements in real-time.

In a practical system, there are times when one or more of the three intermediate frequencies (IFs) are not available during a given lidar measurement. Loss of signal can occur when a given frequency crosses from a negative sign to a positive sign, or when the signal-to-noise ratio (SNR) is too low to accurately detect. For such cases, the intermediate frequencies of one or more previous measurements are used to determine the correct signs to each of the available up-ramp IF section ($F_{UP}$), the down-ramp IF section ($F_{DN}$), or Doppler IF section ($F_{DOP}$).

Figure 6:
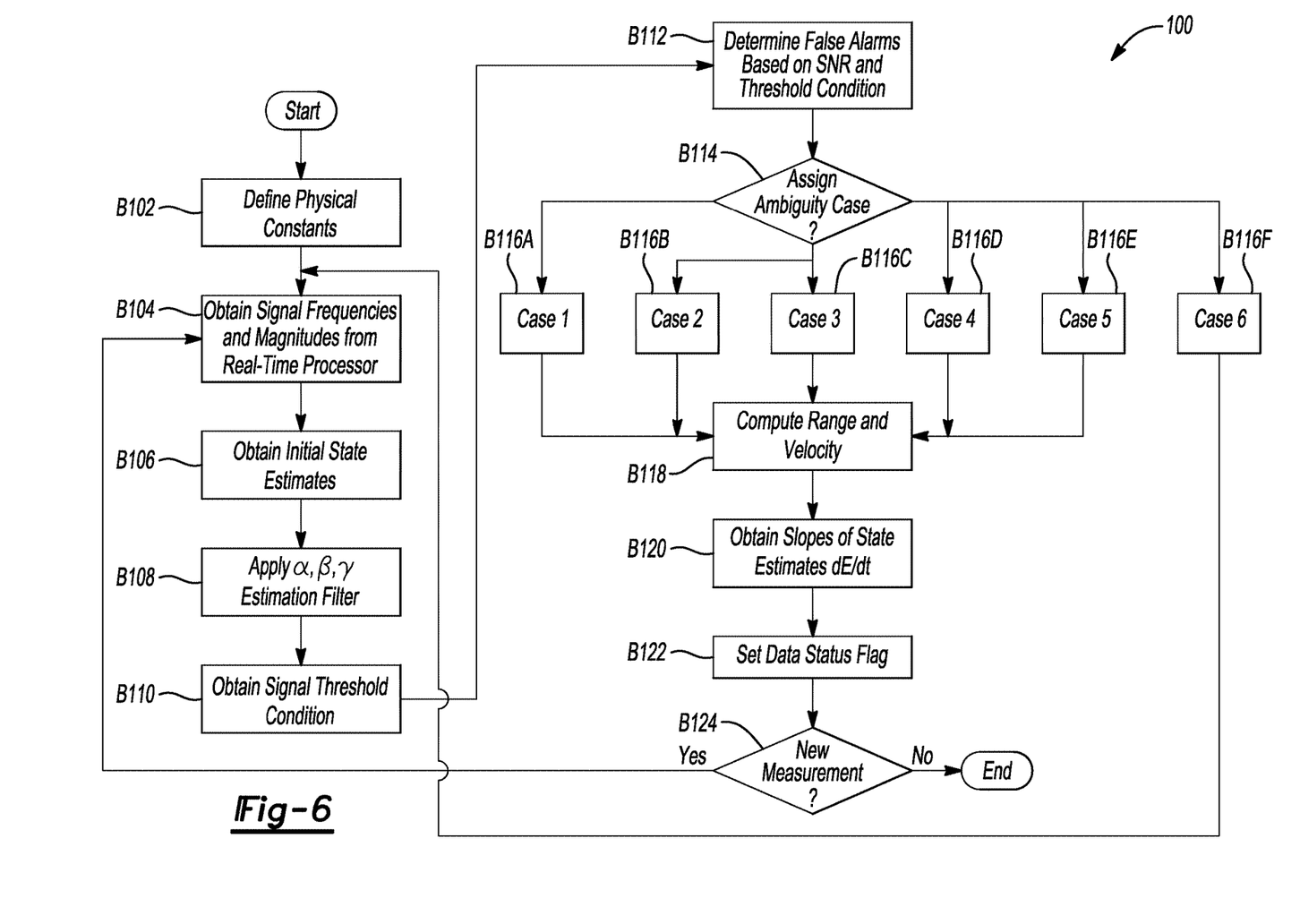
FIG. 6 is a schematic flow chart describing an optional embodiment of the present method.

An exemplary method 100 for performing the present teachings is depicted in FIG. 6. The method 100 may be executed as part of the ongoing operation of the Doppler lidar system 10 of FIG. 1. That is, a target/ground and/or a velocity of the host vehicle 55 relative to the target-of-interest, is coherently detected/measured using three distinct low-power frequency IF sections, i.e., the above-noted up-ramp IF section ($F_{UP}$), down-ramp IF section ($F_{DN}$), and non-modulated/Doppler IF section ($F_{DOP}$) shown in FIG. 3. The method 100 proceeds in a case-specific manner based on which intermediate IF sections are received by the homodyne receiver 24 of FIG. 1: (1) all three of the up-ramp, down-ramp, and Doppler IF sections, (2) only the up-ramp and Doppler IF sections, (3) only the down-ramp and Doppler IF sections, (4) the Doppler IF section alone, (5) the up-ramp and down-ramp IF sections alone, and (6) none of the three IF sections, or only the up-ramp or down-ramp IF section.

FIGS. 7-11 collectively describe sign estimation and assignment for various cases within the context of the method 100, and thus are to be interpreted as being part of the method 100 shown in FIG. 6. Once again, "up-ramp"/"$F_{UP}$" as used herein corresponds to the section of the three-section waveform in which a positive slope linear modulation of frequency exists, "down-ramp"/"$F_{DN}$" corresponds to the portion where a negative slope linear modulation of frequency exists, and "Doppler"/"$F_{DOP}$" corresponds to no time-variant modulation of the carrier frequency.

In the method 100 of FIG. 6, positive/negative signs are estimated for each enumerated case based on the following rules: (1) the up-ramp IF section, $F_{UP}$, is always less than the Doppler IF section $F_{DOP}$, which in turn is always less than the down-ramp IF section $F_{DN}$, i.e., $F_{DN}$>$F_{DOP}$>$F_{UP}$ (when including the sign of the frequencies, as opposed to only the absolute values of the frequencies), (2) during normal operation of an aircraft or spacecraft in flight, $F_{UP}$ and $F_{DN}$ will be equal only when $F_{DOP}$=0, and (3) $F_{UP}$ and $F_{DN}$ are symmetrically separated from each other on opposing sides of $F_{DOP}$ as side-bands, as depicted schematically in FIG. 5.

Beginning with block B102, the method 100 includes defining physical constants or parameters of the lasers used by the Doppler lidar system 10 of FIG. 1 when interrogating a target-of-interest. Typical parameters include transmit frequency, modulation bandwidth, and waveform period. As will be understood by those of ordinary skill in the art, coherent detection using low-power up-ramp and down-ramp signals or "chirps" are performed with a periodic signal or sinusoid whose frequency varies linearly with time. For instance, an exemplary signal having a frequency that increases by 1 GHz over 1 ms has a slope of 1 GHz/ms. Likewise, IFs are directly proportional to target range (R) as follows:

$$f_R = \frac{4RB}{Tc}$$

where B is the modulation bandwidth, T is the waveform period, and c is the speed of light. The method 100 proceeds to block B104 when the physical constants have been defined, and thereafter used in interrogating the target-of-interest. Block B102 is a baseline process used in the operation of the Doppler lidar system 10 of FIG. 1, and thus it is not necessary to perform block B102 with every iteration of the method 100. That is, the values of block B102 are calibrated/predetermined and recorded in memory accessible by the SPU 50.

Block B104 entails receiving a return waveform from an irradiated target-of-interest using the homodyne receiver 24 setup depicted in FIG. 1. Block B104 includes obtaining signal frequencies and magnitudes of the return waveform from the real-time fast Fourier transform (FFT) processor 54 shown in FIG. 2. Processing functions attendant to block B104 may include receiving the return waveform on the three channels shown in FIG. 2, processing the signals through the ADC 52, multiplexing the signals via the multiplexers 53, etc. The method 100 then proceeds to block B106.

In the next four blocks, i.e., B106, B108, B110, and B112, the SPU 50 of FIG. 2 processes the received signals to provide and update state estimates of range and velocity, isolate signals of interest having an application-suitable signal-to-noise ratio (SNR), and eliminate threshold-based false alarms in which the return signals are insufficient for use in detecting the range or velocity. Block B106 obtains initial state estimates from the previous range and velocity measurements, e.g., by estimating such states at time t+1 given knowledge of range and velocity trajectories from prior measurements. The initial state estimates of block B106 should be obtained once, as opposed to doing so in each loop iteration.

At block B108, a state estimation filter is applied to estimate an expected new range and velocity, and to predict the sign of the frequencies for each of the Doppler, Up-ramp, and Down-ramp IF sections noted above. One such filter is the so-called "α, β, γ" tracking filter, as will be understood by those of ordinary skill in the art, or any other suitable filter that, unlike a Kalman filter, does not require access to a state model. Block B108 outputs slopes of Doppler, up-ramp, and down-ramp IFs of previous measurements to be used in determining the sign of the frequency of any one of the Doppler, up-ramp, and down-ramp IFs deemed invalid.

At block B110, a signal threshold is obtained from memory of the SPU 50. Block B112 then determines SNR-based false alarms given the threshold from block B110. The output of block B112 is the set of IF sections, i.e., $F_{DN}$, $F_{UP}$, and $F_{DOP}$ of FIG. 3, with an associated false alarm or validity measure. If amplitude for any of the down-ramp, up-ramp, or Doppler signal falls below a corresponding threshold value, its corresponding frequency $F_{DN}$, $F_{UP}$, or $F_{DOP}$ will be labeled invalid, e.g., in memory of the SPU 50 using a corresponding invalid bit code or bit string, and will not be used. The method 100 then proceeds to block B114.

At block B114, the SPU 50 next evaluates each received IF section from block B112 to determine whether any of the received IF sections is missing. Ideally, all three IF sections $F_{DN}$, $F_{UP}$, and $F_{DOP}$ are received and available in a given measurement cycle. However, at times due to factors such as interference or loss of signal, one or more of the IF sections may not be detected by the homodyne receiver, or may be detected at a degraded level that precludes effective use of the received signal. The SPU 50 responds at block B114 by determining which IF sections are detected, available, and suitable for use.

Based on this information, and as set forth in detail below, the SPU 50 selects one of a plurality of possible sign ambiguity cases, which are nominally labeled Case 1 (block B116A described in FIG. 7), Case 2 (block B116B described in FIG. 8), Case 3 (block B116C described in FIG. 9), Case 4 (block B116D described in FIG. 10), Case 5 (block B116E described in FIG. 11), and Case 6 (block B116F). Thus, while depicted in separate Figures for illustrative clarity, with the exception of Case 6, each one of the cases is handled in a particular way by an algorithm embodying the method 100.

Figure 7:
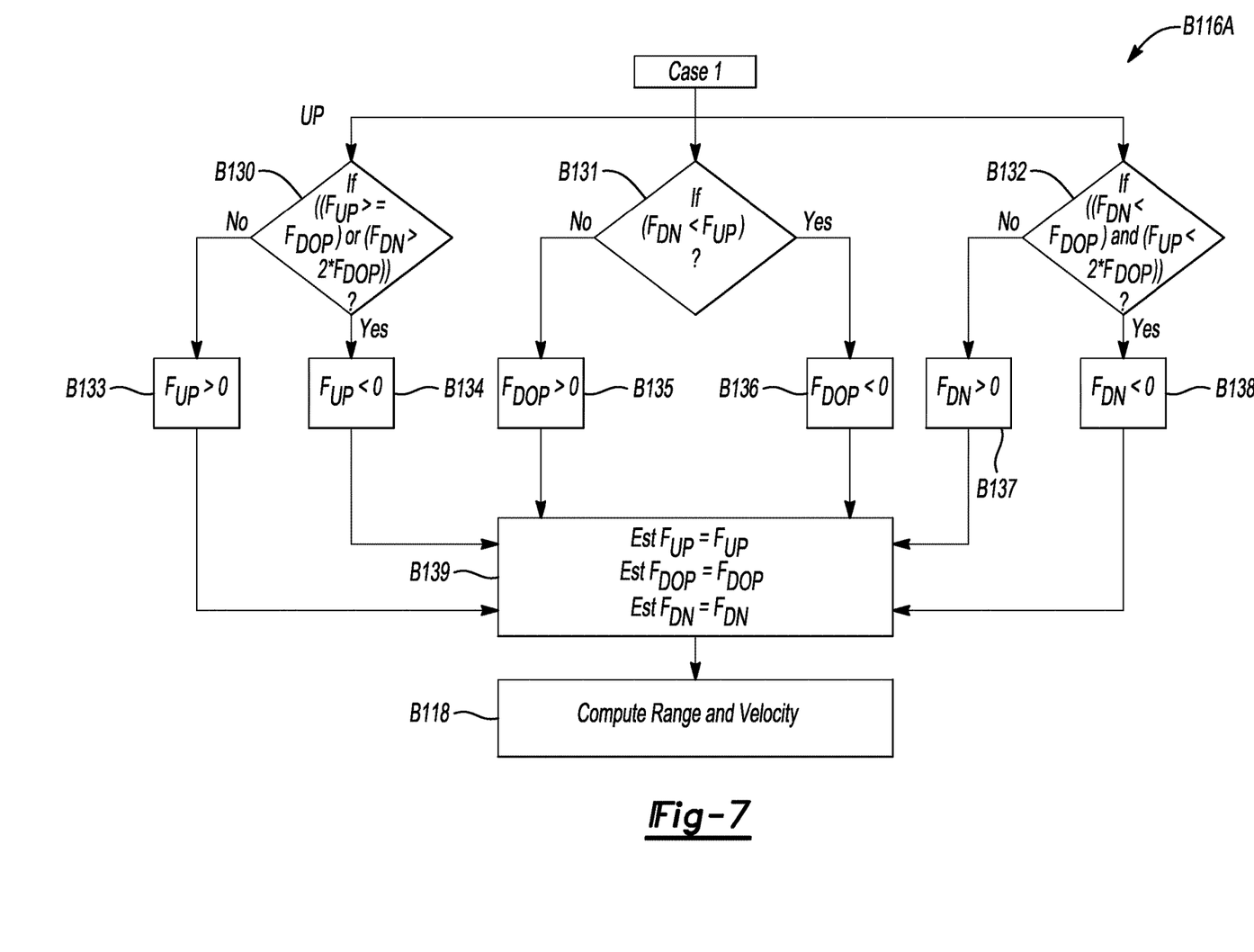
FIGS. 7-11 are schematic flow charts describing alternative cases for resolving sign ambiguity within the context of the exemplary method shown in FIG. 6.

CASE 1—NO AMBIGUITY: Referring to FIG. 7, block B116A describes "Case 1" in which all three of the IF sections are detected by the SPU 50 at a sufficiently high signal quality based on the results of blocks B110 and B112 as described above. Thus, Case 1 is the ideal situation when using the Doppler lidar system 10 of FIG. 1. The SPU 50 executes sub-blocks B130, B131, and B132 to determine the sign of each of the up-ramp IF, Doppler IF, and down-ramp IF sections. At sub-block B130, the SPU 50 determines if the up-ramp IF section equals or exceeds the Doppler IF section, i.e., $F_{UP} \geq F_{DOP}$, or if the down-ramp IF section exceeds twice the Doppler IF, i.e., $F_{DN} > 2*F_{DOP}$. If either case is true, the SPU 50 assigns a negative sign ("$F_{UP} < 0$") to up-ramp IF section in sub-block B134, which carries into sub-block B139. Otherwise, the SPU 50 assigns a positive sign ("$F_{UP} > 0$") to the up-ramp IF section in sub-block B133, which likewise carries into sub-block B139.

At block B131, the SPU 50 determines if the down-ramp IF section is less than the up-ramp IF section. The SPU 50 assigns a negative sign ("$F_{DOP} < 0$") to the Doppler IF section in sub-blocks B136 and B139. Otherwise, the SPU 50 assigns a positive sign ("$F_{DOP} > 0$") to the Doppler IF in sub-blocks B135 and B139.

Still referring to FIG. 7, at sub-block B132 the SPU 50 determines if the down-ramp IF is less than Doppler IF, and if the up-ramp IF is less than twice the Doppler, i.e., $F_{DN} < F_{DOP}$ and $F_{up} < 2*F_{DOP}$, respectively. If both cases are true, the SPU 50 assigns a negative sign ("$F_{DN} < 0$") to the down-ramp IF in sub-blocks B138 and B139. Otherwise, when either case of sub-block B132 is not true, the SPU 50 assigns a positive sign ("$F_{DN} > 0$") to the down-ramp IF in sub-blocks B137 and B139. Sub-block B139 in particular is used to assign the estimated signed values for $F_{UP}$, $F_{DOP}$, and $F_{DN}$ as noted in the previous paragraphs, which subsequently can be used in future loop iterations when one or more of the IF's is degraded, i.e., in Cases 2-5.

Sub-block B118 entails computing the range and velocity using the magnitude of the Doppler IF and one of the up-ramp IF or down-ramp IF magnitudes, with the appropriate signs updated in sub-block B139 as noted above.

Figure 8:
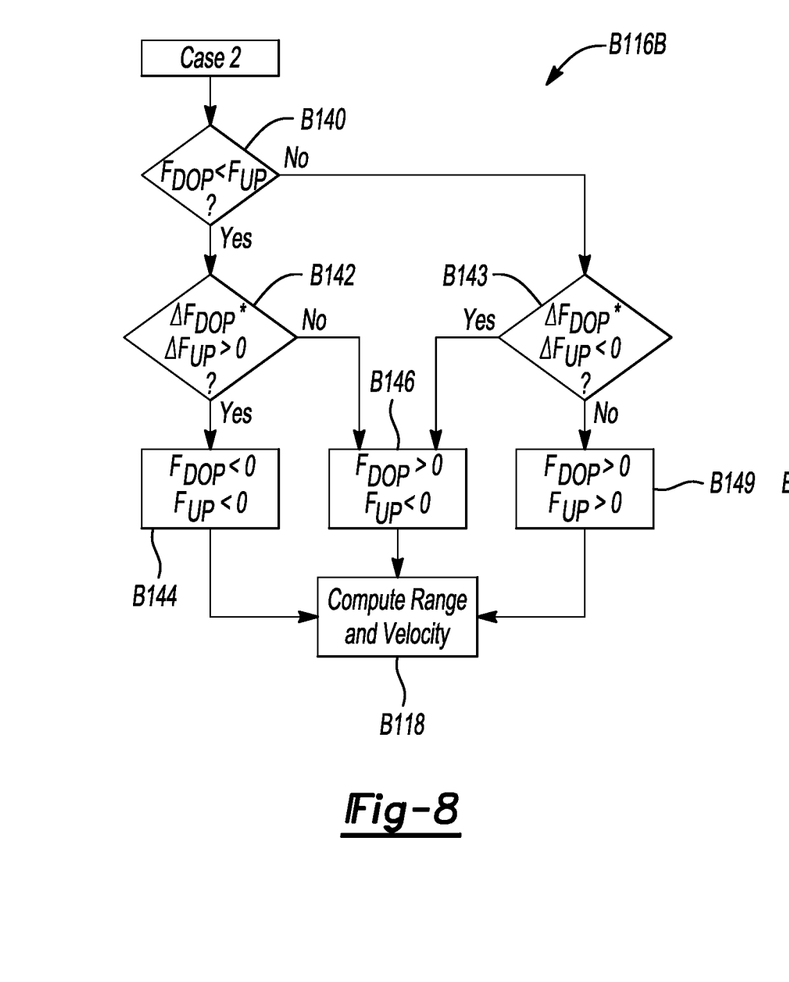

CASE 2—$F_{DOP}$ and $F_{UP}$: Referring to FIG. 8 describing block B116B in further detail, at sub-block B140 the SPU 50 determines if the Doppler IF section is less than the up-ramp IF section, i.e., $F_{DOP} < F_{UP}$. The SPU 50 executes sub-block B142 when this is the case, or proceeds to sub-block B143 in the alternative when $F_{DOP} > F_{UP}$.

At sub-block B142, the SPU 50 determines if the product of the slope of the Doppler IF section ($\Delta F_{DOP}$) and up-ramp IF section ($\Delta F_{UP}$) of the previous block B108 estimate is positive. If so, block B116B proceeds to sub-block B144. The SPU 50 executes sub-block B146 in the alternative when the product is negative.

At sub-block B143, the SPU 50 determines if the product of the slope of the Doppler IF section ($\Delta F_{DOP}$) and up-ramp IF section ($\Delta F_{UP}$) previously estimated at block B108 is negative. If so, block B116B proceeds to sub-block B146. The SPU 50 executes sub-block B149 in the alternative when the product is positive.

Sub-block B144 includes assigning a negative sign to each of the Doppler IF section and the up-ramp IF section before proceeding to block B118 (FIG. 6, described below).

Sub-block B146 respectively entail assigning a positive sign to the Doppler IF section and a negative sign to the up-ramp IF section before proceeding to block B118.

Sub-block B149 entails assigning a positive sign to each of the Doppler IF section and the up-ramp IF section before proceeding to block B118 of FIG. 6 as described below.

Figure 9:
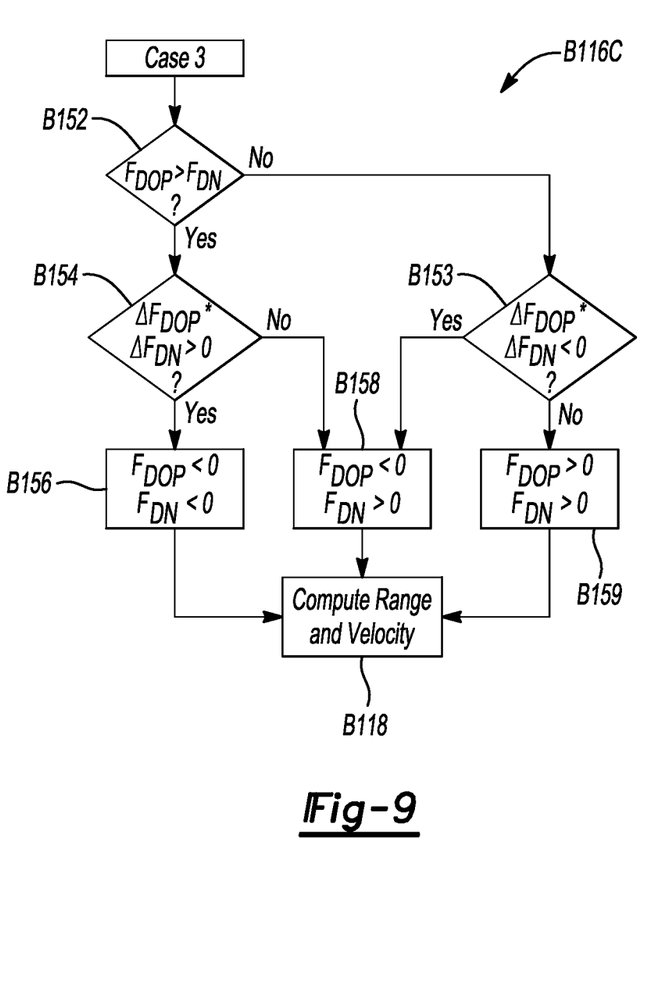

CASE 3—$F_{DOP}$ and $F_{DN}$: Referring to FIG. 9, block B116A describes Case 3. Here, the SPU 50 determines whether $F_{DOP} > F_{DN}$ in sub-block B152. If so, sub-block B152 proceeds to sub-block B154, with sub-block B152 otherwise proceeding to sub-block B153.

At sub-block B153, the SPU 50 determines if the product of the slope of Doppler IF section and the down-ramp IF section is negative, i.e., $\Delta F_{DOP} * \Delta F_{DN} < 0$. If so, block B116C proceeds to sub-block B158. Sub-block B159 is executed in the alternative when $\Delta F_{DOP} * \Delta F_{DN} > 0$.

At sub-block B154, the SPU 50 determines if the product of the slope of the Doppler IF section and that of the down-ramp IF section is positive, i.e., $\Delta F_{DOP} * \Delta F_{DN} > 0$. If so, block B116C proceeds to sub-block B156. Block B116C instead proceeds to sub-block B158 when $\Delta F_{DOP} * \Delta F_{DN} < 0$.

At sub-block B156, the SPU 50 assigns a negative sign to each of the Doppler IF section and the down-ramp IF section, and then proceeds to sub-block B118 (FIG. 6, described below).

At sub-block B158, the SPU 50 assigns a negative sign to the Doppler IF section and a positive sign to the down-ramp IF section, and then proceeds to sub-block B118 (FIG. 6, described below).

Sub-block B159 includes assigning, via the SPU 50, a positive sign to each of the Doppler IF section and the down-ramp IF section before proceeding to sub-block B118 (FIG. 6, described below).

Figure 10:
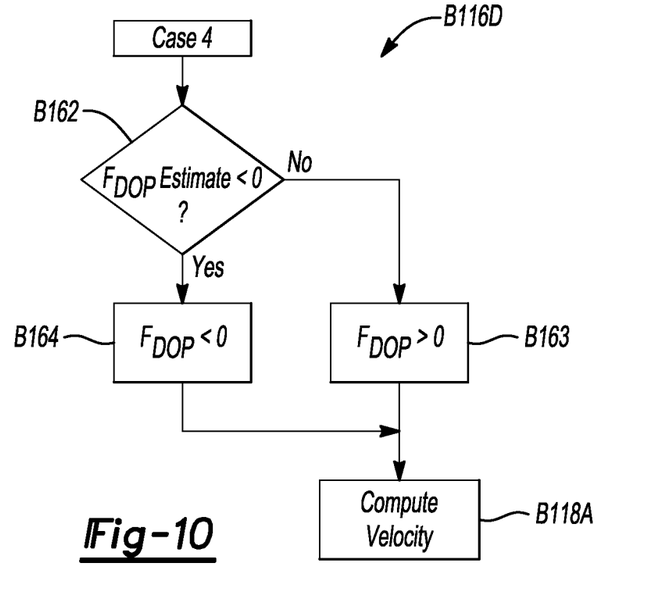

CASE 4—$F_{DOP}$ only: Referring to FIG. 10, block B116D describes Case 4 commencing at sub-block B162. The SPU 50 determines if an estimate of the Doppler frequency ($F_{DOP, est}$) is negative, i.e., using the existing state estimate for velocity. Estimation of the Doppler frequency, as will be appreciated by those of ordinary skill in the art, may use past values and trajectories to determine a specific present or future value, with the SPU 50 updating state estimates in real time during operation of the host vehicle 55. Block B116D proceeds to sub-block B163 when $F_{DOP, est}$ is positive, and to sub-block B164 when $F_{DOP, est}$ is negative.

At sub-blocks B163 and B164, the SPU 50 respectively assigns a positive sign (sub-block B163) or a negative sign (sub-block B164) to the Doppler IF section, and then proceeds to block B118A.

Figure 11:
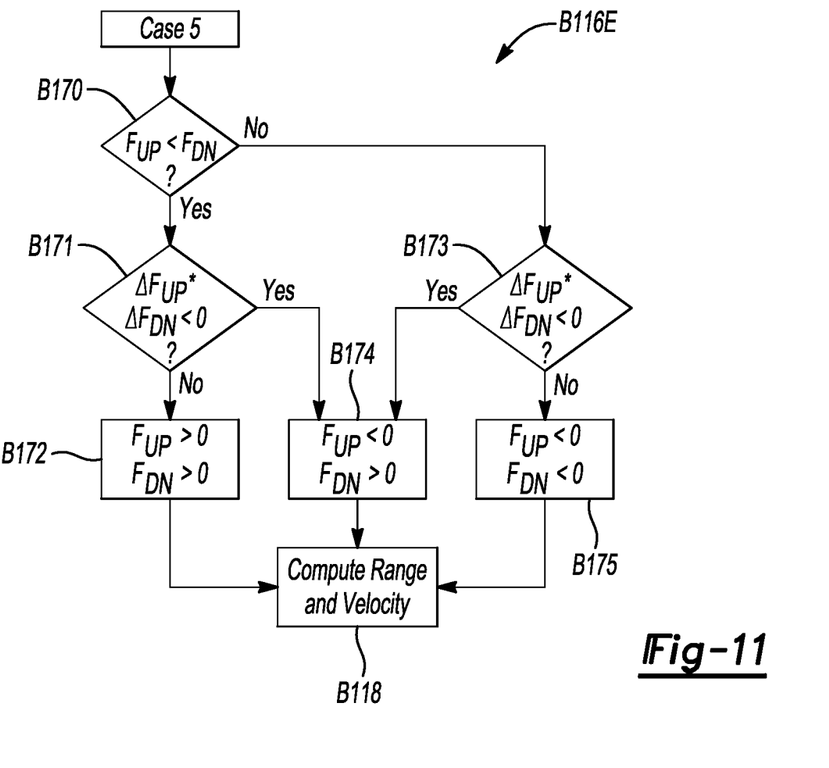

CASE 5—$F_{DN}$ and $F_{UP}$: Referring to FIG. 11, block B116E describes the various sub-blocks for treatment of Case 5. At sub-block B170, the SPU 50 determines whether $F_{UP} < F_{DN}$. The SPU 50 executes sub-block B171 when this is the case, and proceeds in the alternative to sub-block B173 when $F_{UP} \geq F_{DN}$.

At sub-block B171, the SPU 50 next determines if the product of the slope of the up-ramp IF section ($\Delta F_{UP}$) and the down-ramp IF section ($\Delta F_{DN}$) of the previous estimate (block B108 of FIG. 6) is negative. If so, the SPU 50 proceeds to sub-block B174. The SPU 50 executes sub-block B172 in the alternative when the product is positive.

At sub-block B173, the SPU 50 determines if the product of the slope of the up-ramp IF section ($\Delta F_{UP}$) and the down-ramp IF section ($\Delta F_{DN}$) estimate is negative. The SPU 50 proceeds to sub-block B174 when this case is true. The SPU 50 executes sub-block B175 in the alternative when the product is positive.

At sub-blocks B172, B174, and B175, the SPU 50 of FIG. 1 respectively assigns a positive or negative sign to the down-ramp and up-ramp IF sections, and then proceeds to block B118.

CASE 6—No IF sections, or $F_{DN}$ only, or $F_{UP}$ only: As noted above, Case 6 is an "invalid state" condition. Thus, selection of Case 6 at block B114 (FIG. 6) results in recording of an error state, e.g., as a bit flag, before returning to block B104.

Referring once again to FIG. 6, once an ambiguity case has been assigned, the method 100 proceeds to block B118. Block B118 entails generating new state estimates via the SPU 50 using the range and velocity estimates from block B116A, 116B, 116C, 116D, or 116E. In the unique case of FIG. 10, block B118 entails computing velocity alone, with this difference denoted by the suffix "A", i.e., block B118A. As will be appreciated, state estimation is a periodically or continuously updated process that uses past state values to predict the present state, and to establish an accurate baseline for predicting a future state. Thus, block B118 is complete when the Doppler lidar system 10 has a new set of state estimates, in this case velocity and range. The new state estimates are then used to update the filter at block B106.

At block B120, the SPU 50 obtains slopes of the state estimates from block B118, records the slopes, and then proceeds to block B122. As will be appreciated, a slope is a rate of change of the state estimate, and therefore a predetermined past number of state estimates may be used to determine the slope to provide the desired immunity to noise or errant state estimates.

Block B122 includes setting a data status bit flag in memory indicative of the case number and completion of an iteration of the method 100. The method 100 then proceeds to block B124.

At block B124, the SPU 50 determines if a new measurement by the Doppler lidar system 10 has been received. If so, the method 100 returns to block B104, with the method 100 otherwise being complete ("End").

The method 100 described above with reference to FIGS. 6-11 thus enables estimation of sign of the intermediate frequencies in the Doppler lidar system 10 of FIG. 1 when all three IF sections are present (Case 1), or in a different manner when only certain IF sections are available (Cases 2-5). Since it is possible for a given measurement that any given one of the IF sections is positive or negative, there exists a finite probability that a sign is incorrectly estimated, creating ambiguity in the determination of the direction of the Doppler shift and/or determination of range. The method 100 is thus useful for determining which of the three IF sections $F_{UP}$, $F_{DN}$, and $F_{DOP}$ is detected and available, and thereafter obtaining a range or velocity estimate. The present method 100 may include controlling an operation of the host vehicle 55 using the range and/or the velocity determined via the above-described method 100, i.e., directly using the range or velocity information in a flight control operation, or indirectly by feeding the calculated and estimated information to another control device aboard the host vehicle 55.

As will be appreciated, the Doppler lidar system 10 of FIG. 1 operates continuously in real-time to produce independent range and velocity measurements by each line-of-sight used to take a given lidar measurement. Past measurements of range and velocity are used by the SPU 50 to provide estimates of an expected new range and velocity measurement. These estimates may be obtained by applying the above-noted α, β, γ estimation filter from FIG. 6 to past measurements, or using other suitable means. The estimates are then used during transient or temporary periods of signal loss to reduce uncertainty in the sign of the intermediate frequencies once signals are re-established, as opposed to being used to replace a value of an actual measurement.

Precision range and velocity data provided by the Doppler lidar system 10 of FIG. 1 as set forth in FIGS. 1-11 may be used in robotic and/or human landing missions, e.g., to enable precision navigation to the desired landing location on the Earth, the moon, Mars, an asteroid, or other planetary body. As an Automated Rendezvous and Docking (AR&D) sensor possibility, the Doppler lidar system 10 can provide all the necessary data including relative position, approach velocity, and relative orientation and attitude of a docking port. The disclosed solutions can also benefit terrestrial applications such as aircraft navigation without reliance on external satellite signals. Conventional aircraft Guidance, Navigation, and Control (GN&C) systems combine inertial measurement unit data with the signals from a Global Positioning System (GPS) to determine a vehicle's position and vehicle velocity vector. However, the GPS signal can be blocked or jammed by intentional or unintentional interference, thus causing significant deviation in the navigation solution. The lidar system 10 thus allows navigation in GPS-denied environments.

Additionally, the disclosed Doppler lidar system 10 can also make a dramatic impact on the ongoing efforts for achieving safe and efficient operation of autonomous ground vehicles. By scanning its laser beam in FIG. 1, the Doppler lidar system 10 can provide three-dimensional (3D) images of the surrounding environment in addition to discerning the velocity of moving objects within its field of regard, and thus has potential benefits in the realm of driverless vehicles to directly and accurately provide critical speed, 3D range, and Doppler/velocity images of the vehicle surroundings. These and other possible benefits will be readily envisioned by those of ordinary skill in the art in view of the foregoing teachings.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed is:

1. A frequency modulated continuous wave (FMCW) Doppler lidar system for use with a host vehicle, comprising:
    a laser system configured to generate first, second, and third laser beams and first, second, and third local oscillator beams using a seed laser and a beam splitter;
    a frequency modulator configured to generate a modulated three-section waveform using the first, second, and third laser beams and the first, second, and third local oscillator beams, the modulated three-section waveform having a Doppler frequency section, an up-ramp frequency section, and a down-ramp frequency section;
    first, second, and third lenses configured to transmit the modulated three-section waveform toward a target-of-interest, and to receive respective first, second, and third return signals reflected from the target-of-interest;
    a homodyne receiver configured to receive and mix the first, second, and third return signals with a respective one of the first, second, and third local oscillator beams to output a three-section return waveform having a Doppler intermediate frequency (IF) section, an up-ramp IF section, and a down-ramp IF section; and
    a signal processing unit (SPU) coupled to the homodyne receiver and configured to estimate a sign of, and measure a respective magnitude and frequency of, the up-ramp IF section, the down-ramp IF section, and the Doppler IF section, to calculate a range to the target-of-interest and/or velocity of the host vehicle relative to the target-of-interest using the respective magnitude, frequency, and sign, and to control an operation of the host vehicle using the range and/or the velocity,
    wherein the SPU, in response to one of the up-ramp IF section, the Doppler IF section, and the down-ramp IF section not being detected by the homodyne receiver, is configured to mitigate sign ambiguity by assigning a positive or negative sign to the undetected IF section based on respective slopes of the detected IF sections.

2. The FMCW Doppler lidar of claim 1, wherein the SPU, in response to the magnitude of the up-ramp IF section equaling or exceeding the magnitude of the Doppler IF section, or the magnitude of the down-ramp IF section exceeding twice the magnitude of the Doppler IF section, is configured to assign a negative sign to the up-ramp IF section, and to alternatively assign a positive sign to the up-ramp IF section when the magnitude of the up-ramp IF section is less than the magnitude of the Doppler IF section, and the magnitude of the down-ramp IF section does not exceed twice the magnitude of the Doppler IF section.

3. The FMCW Doppler lidar system of claim 1, wherein the SPU, in response to the Doppler IF section and only one of the up-ramp IF section or the down-ramp IF section being detected by the homodyne receiver as an available side-band frequency, is configured to calculate a product of a respective slope of the Doppler IF section and the available side-band frequency, and to assign a positive sign or a negative sign to the Doppler IF section and to the available side-band frequency based on a sign of the product.

4. The FMCW Doppler lidar system of claim 3, wherein when the available side-band frequency is the down-ramp IF section, the magnitude of the Doppler IF section exceeds the magnitude of the down-ramp IF section, and the slope is positive, the SPU is configured to assign a negative sign to the Doppler IF section and the down-ramp IF section.

5. The FMCW Doppler lidar system of claim 3, wherein when the available side-band frequency is the down-ramp IF section, the magnitude of the Doppler IF section is less than the magnitude of the down-ramp IF section, and the slope is negative, the SPU is configured to assign a negative sign to the Doppler IF section and a positive sign to the down-ramp IF section.

6. The FMCW Doppler lidar system of claim 3, wherein when the available side-band frequency is the up-ramp IF section, the magnitude of the Doppler IF section is less than the magnitude of the up-ramp IF section, and the slope is positive, the SPU is configured to assign a negative sign to the Doppler IF section and the up-ramp IF section.

7. The FMCW Doppler lidar system of claim 3, wherein when the magnitude of the Doppler IF section exceeds the magnitude of the up-ramp IF section and the slope is negative, the SPU is configured to assign a positive sign to the Doppler IF section and a negative sign to the up-ramp IF section.

8. The FMCW Doppler lidar system of claim 1, wherein the SPU is configured to estimate a Doppler frequency during operation of the host vehicle, and in response to only the Doppler IF section being detected by the homodyne receiver, to assign a sign of the Doppler IF section as being equal to a sign of the estimated Doppler frequency.

9. The FMCW Doppler lidar system of claim 1, wherein the SPU is configured, in response to the up-ramp IF section and the down-ramp IF section being detected by the homodyne receiver without detection of the Doppler IF section:
    when the magnitude of the up-ramp IF section is less than the magnitude of the down-ramp IF section, and a product of a respective slope of the up-ramp IF section and the down-ramp IF section is negative, to assign a negative sign to the up-ramp IF section and a positive sign to the down-ramp IF section;
    when the magnitude of the up-ramp IF section is less than the magnitude of the down-ramp IF section, and the product is positive, to assign a positive sign to the up-ramp IF section and the down-ramp IF section;
    when the magnitude of the up-ramp IF section is greater than the magnitude of the down-ramp IF section, and the product is negative, to assign a negative sign to the up-ramp section and a positive sign to the down-ramp section; and when the magnitude of the up-ramp IF section is greater than the magnitude of the down-ramp IF section, and the product is positive, to assign a negative sign to the up-ramp IF section and the down-ramp IF section.

10. The FMCW Doppler lidar system of claim 1, wherein the SPU is configured to record and/or transmit an error code when none of the Doppler IF section, the up-ramp IF section, and the down-ramp IF section are detected by the homodyne receiver, when only the up-ramp IF section is detected, or when only the down-ramp IF section is detected.

11. A method for using a frequency modulated continuous wave (FMCW) Doppler lidar system aboard a host vehicle, the method comprising:

generating, via a laser system having a seed laser and a beam splitter, first, second, and third laser beams and first, second, and third local oscillator beams;

generating a modulated three-section waveforms, via a frequency modulator using the first, second, and third laser beams and the first, second, and third local oscillator beams, the modulated three-section waveform having a Doppler section, an up-ramp section, and a down-ramp section;

transmitting, using first, second, and third lenses, the modulated three-section waveform toward a target-of-interest external to the host vehicle;

receiving, using the first, second, and third lenses, respective first, second, and third return beams reflected from the target-of-interest;

mixing, via first, second, and third photoreceptors of a homodyne receiver, each of the first, second, and third return beams and a respective one of the first, second, and third local oscillator beams to generate a three-section return waveform having a Doppler intermediate frequency (IF) section, an up-ramp IF section, and a down-ramp IF section;

measuring, via a signal processing unit (SPU), a respective magnitude and frequency of the up-ramp IF section, the down-ramp IF section, and/or the Doppler IF section of the three-section return waveform;

estimating, via the SPU, a sign of each of the up-ramp IF section, the down-ramp IF section, and/or the Doppler IF section of the three-section return waveform, wherein in response to one of the up-ramp IF section, the Doppler IF section, and the down-ramp IF section not being detected by the homodyne receiver, mitigating sign ambiguity by assigning, via the SPU, a positive or negative sign to the undetected IF section based on respective slopes of the detected IF sections;

calculating a range to the target-of-interest and/or velocity of the host vehicle relative to the target-of-interest using the respective magnitude, frequency, and sign; and controlling an operation of the host vehicle using the range and/or the velocity.

12. The method of claim 11, further comprising:
in response to the magnitude of the up-ramp IF section equaling or exceeding the magnitude of the Doppler IF section, or the magnitude of the down-ramp IF section exceeding twice the magnitude of the Doppler IF section, assigning a negative sign to the up-ramp IF section via the SPU.

13. The method of claim 11, further comprising, in response to the Doppler IF section and only one of the up-ramp IF section or the down-ramp IF section being detected by the homodyne receiver as an available side-band frequency, calculating a product of a respective slope of the Doppler IF section and the available side-band frequency via the SPU, and thereafter assigning a positive or negative sign to the Doppler IF section and to the available side-band frequency based on a sign of the product.

14. The method of claim 13, further comprising: in response to the available side-band frequency being the down-ramp IF section, the magnitude of the Doppler IF section exceeding the magnitude of the down-ramp IF section, and the slope being positive, assigning a negative sign to the Doppler IF section and the down-ramp IF section via the SPU.

15. The method of claim 13, further comprising: in response to the available side-band frequency being the down-ramp IF section, the magnitude of the Doppler IF section being less than the magnitude of the down-ramp IF section, and the slope being negative, assigning a negative sign to the Doppler IF section and a positive sign to the down-ramp IF section via the SPU.

16. The method of claim 13, further comprising: in response to the available side-band frequency being the up-ramp IF section, the magnitude of the Doppler IF section being less than the magnitude of the up-ramp IF section, and the slope being positive, assigning a negative sign to the Doppler IF section and the up-ramp IF section via the SPU.

17. The method of claim 13, further comprising, in response to the magnitude of the Doppler IF section exceeding the magnitude of the up-ramp IF section and the slope being negative or positive, assigning a positive sign to the Doppler IF section, and assigning a negative sign or a positive sign to the up-ramp IF section, respectively.

18. The method of claim 13, further comprising:
estimating a Doppler frequency during operation of the host vehicle, via the SPU; and
in response to only the Doppler IF section being detected by the homodyne receiver, setting a sign of the Doppler IF section equal to a sign of the estimated Doppler frequency.

19. The method of claim 11, further comprising, in response to only the up-ramp IF section and the down-ramp IF section being detected by the homodyne receiver as an available side-band frequency, when the magnitude of the up-ramp IF section is less than the magnitude of the down-ramp IF section, and a product of a respective slope of the up-ramp IF section and the down-ramp IF section is negative, assigning a negative sign to the up-ramp IF section and a positive sign to the down-ramp IF section via the SPU, when the magnitude of the up-ramp IF section is less than the magnitude of the down-ramp IF section, and the product is positive, assigning a positive sign to the up-ramp IF section and the down-ramp IF section, when the magnitude of the up-ramp IF section is greater than the magnitude of the down-ramp IF section, and the product is negative, assigning a negative sign to the up-ramp section and a positive sign to the down-ramp section, and when the magnitude of the up-ramp IF section is greater than the magnitude of the down-ramp IF section, and the product is positive, assigning a negative sign to the up-ramp IF section and the down-ramp IF section.

20. The method of claim 11, wherein the host vehicle is a spacecraft or an aircraft, the target of interest is a ground surface, and controlling the operation of the host vehicle includes controlling a landing operation of the spacecraft or the aircraft.

* * * * *